(12) United States Patent
Darredeau et al.

(10) Patent No.: US 6,536,233 B2
(45) Date of Patent: Mar. 25, 2003

(54) PROCESS AND INSTALLATION FOR THE PRODUCTION OF ULTRA-PURE OXYGEN BY DISTILLATION OF AIR

(75) Inventors: Bernard Darredeau, Sartrouville (FR); Alain Briglia, Corze (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 10/097,860

(22) Filed: Mar. 15, 2002

(65) Prior Publication Data

US 2002/0129618 A1 Sep. 19, 2002

(30) Foreign Application Priority Data

Mar. 16, 2001 (FR) .............................. 01 03606

(51) Int. Cl.⁷ ................................................. F25B 1/00
(52) U.S. Cl. .......................... 62/643; 62/905; 159/43.1; 202/158; 261/97
(58) Field of Search ................... 62/643, 905; 202/158; 159/43.1; 261/97

(56) References Cited

U.S. PATENT DOCUMENTS

| | | | | | |
|---|---|---|---|---|---|
| 5,071,458 A | * | 12/1991 | Granier et al. | ................ | 62/903 |
| 5,132,055 A | * | 7/1992 | Alleaume et al. | ............. | 261/97 |
| 5,518,667 A | * | 5/1996 | Lehman | ....................... | 261/97 |
| 5,724,834 A | * | 3/1998 | Srinivasan et al. | ........... | 62/643 |
| 5,897,748 A | * | 4/1999 | Kaibel | ........................ | 202/158 |
| 5,901,574 A | * | 5/1999 | Rohde | .......................... | 62/903 |

FOREIGN PATENT DOCUMENTS

| | | | |
|---|---|---|---|
| EP | 0 798 524 | * | 10/1997 |
| EP | 0 913 654 | * | 5/1999 |

* cited by examiner

*Primary Examiner*—Ronald Capossela
(74) *Attorney, Agent, or Firm*—Young & Thompson

(57) ABSTRACT

A mixture containing oxygen is introduced into a distillation column (1); an intermediate stream, substantially free from impurities heavier than oxygen, is withdrawn (at 17) at a level of the column located above the point (4) of introduction of the air, the point (22) of withdrawal being separated from this point (4) of introduction by a distillation section (6), particularly with packing; the stream withdrawn (at 17) is sent to an oxygen purification column (2), and a reflux liquid is distributed over the section (6) by a distributor (9). A predetermined non-uniformity of the distribution of the reflux liquid over the upper surface (8) of the section (6) is effected in at least one localized region (23) of this surface.

16 Claims, 3 Drawing Sheets

PROCESS AND INSTALLATION FOR THE PRODUCTION OF ULTRA-PURE OXYGEN BY DISTILLATION OF AIR

FIELD OF THE INVENTION

The present invention relates to a process for the production of ultra-pure oxygen by distillation of air, of the type in which a mixture containing oxygen, particularly air, is introduced into a distillation column which produces at its bottom a product rich in oxygen; an intermediate stream is withdrawn, substantially stripped of impurities heavier than oxygen, at a level of the column located above the point of introduction of said mixture, the point of withdrawal being spaced from this point of introduction of said mixture by a distillation section, particularly with packing; the withdrawn stream is sent to an oxygen purification column which produces at its bottom ultra-pure oxygen; and a liquid reflux is distributed over said section by means of a distributor comprising perforations for the passage of liquid and openings for the passage of gas.

In what follows, it will be supposed that the starting mixture is air.

BACKGROUND OF THE INVENTION

In processes of this type, the presence of the distillation section located between the point of introduction of the air and the point of withdrawal of the intermediate stream, guarantees the substantially total absence in this flow, of impurities heavier than oxygen, and in particular methane, which is the lightest impurity among them. The elimination of these heavy impurities is carried out by the distillation section, to produce contents acceptable for the production of the desired ultra-pure oxygen.

The drawback of this method is that this number of plates required to eliminate the heavy products, also reduces the oxygen content at the level of withdrawal and thus renders distillation in the pure oxygen column more difficult, with the result of lower output of ultra-pure oxygen.

To limit this drawback, it has been proposed (U.S. Pat. No. 5,590,543) to reduce the quantity of reflux in the distillation section in question, by withdrawing from the distillation column a liquid fraction which supplies the section in question and by reinjecting it into the same column below the latter. As a result, the oxygen-nitrogen separation in the section is less effective, which leads to an increased oxygen content at the level of withdrawal.

The negative effect of this arrangement on the elimination of heavy impurities can be compensated by a slight increase of the number of theoretical plates (increasing the number of plates or of the height of the packing). This increase has little effect on the oxygen/nitrogen separation, because the latter takes place in the minimum reflux region, where the number of plates is a less sensitive parameter.

This solution is effective, but has a drawback: there is removed a liquid which is very pure as to heavy contaminants, and this liquid is reinjected directly into a fraction rich in heavy impurities (adjacent the air supply). This line of direct communication between the region in which it is desired to maintain a very high purity, and a region in which there exists a high concentration of pollutants, is undesirable, because the risk thus arises of accidental pollution of the oxygen purification column during stoppage or a transition phase of the installation or on the occasion of an erroneous manipulation.

SUMMARY OF THE INVENTION

The invention has for its object to obtain enrichment in oxygen of the intermediate flow with a higher degree of security.

To this end, the invention has for its object a process of the mentioned type, characterized in that there is carried out a predetermined deficiency in the uniformity of the distribution of the reflux liquid over the upper surface of said section in at least one localized region of this surface.

The process according to the invention can comprise one or several of the following characteristics:

- the predetermined deficiency of uniformity is effected by withdrawing from the distillation column a controlled fraction of the liquid which supplies the distributor and by locally reinjecting into the same column this fraction below the distributor and over the upper surface of said section, such that the place or places on said surface which receive this fraction, receive a liquid flow substantially greater than that received by other positions on said surface;
- the predetermined deficiency of uniformity is effected by creating a deficiency of uniformity of the perforations for passage of liquid from the distributor, in line with said region, relative to an arrangement of perforation leading to a distribution of liquid of optimum uniformity over said upper surface;
- said localized region is adjacent the central axis of the column;
- said localized region is adjacent the periphery of the distributor; and
- all of the liquid which supplies the distributor and which is not sent to the purification column is sent onto said upper surface.

The invention also has for its object an installation for the production of ultra-pure oxygen by distillation of air, adapted to practice the process defined above. This installation, of the type comprising a distillation column provided with an introduction point for a mixture containing oxygen, particularly air, and a withdrawal point of an intermediate flow substantially free from impurities heavier than oxygen, the withdrawal point being located above the point of introduction of said mixture and being separated from the latter by a distillation section, particularly with packing; an oxygen purification column which produces at its bottom ultra-pure oxygen; a conduit which connects said point of withdrawal to the head of the oxygen purification column; and means for distributing reflux liquid over the upper surface of said section, these means comprising a distributor which comprises perforations for the passage of liquid and openings for the passage of gas, is characterized in that the distribution means are adapted to carry out a predetermined deficiency of uniformity of the distribution of the reflux liquid over the upper surface of said section in at least a localized region of said surface.

According to other characteristics of this installation:

- distribution means comprising moreover a conduit for withdrawal from the distillation column, of a controlled fraction of the liquid which supplies the distributor, and for reinjection of this fraction in the same column, below the distributor, and over the upper surface of said section, such that the region or regions of said upper surface which receive said fraction receive a flow rate of liquid substantially greater than that received by other positions on said surface;
- the distributor comprises a perforated bottom whose perforations have a predetermined non-uniformity relative to the arrangement of the perforations which would lead to an optimum uniformity of distribution of the liquid over said upper surface;

in line with said region, the distributor comprises perforations for the passage of supplemental liquid relative to an arrangement of perforations leading to a distribution of liquid of optimum uniformity over said upper surface;

in line with said region, the distributor comprises perforations for the passage of liquid, of increased or reduced dimensions, relative to an arrangement of the same perforations leading to a distribution of liquid of optimum uniformity over said upper surface; and said localized region is adjacent the central axis of the column.

BRIEF DESCRIPTION OF THE DRAWINGS

Examples of practice of the invention will now be described with respect to the accompanying drawings, in which.

DETAILED DESCRIPTION OF THE INVENTION

Figure 1:
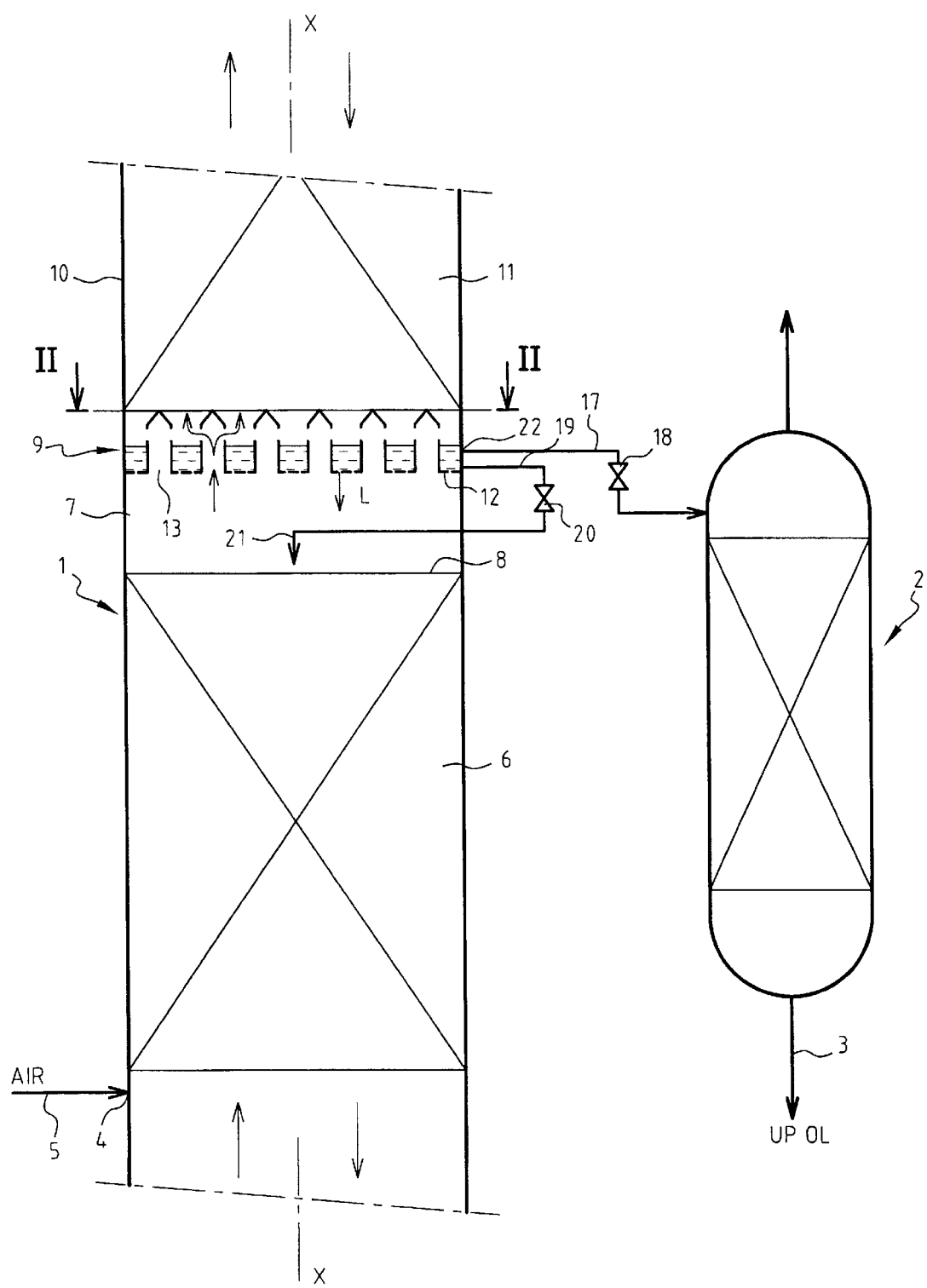
FIG. 1 is a fragmentary schematic view of an installation according to the invention.

There is shown in FIG. 1 the lower portion of an air distillation column 1 supplied at its bottom with previously compressed air, purified of water and $CO_2$, by cooling to adjacent its dew point. This column 1 can be the medium pressure column of a double column for the distillation of air, or a single distillation column for air, for example for the production of nitrogen (HPN or "High Purity Nitrogen" column) . There is also shown in FIG. 1 an oxygen purification column 2 coupled to the column 1 and producing at its bottom UPLO (ultra-pure liquid oxygen) via a production conduit 3.

The air to be treated is introduced into the column 1 at a point 4, via a supply conduit 5. Above the point 4, the column contains a distillation section 6, for example with structured packing such as crossed corrugation packing. A free space 7 is provided above the flat upper surface 8 of the section 6. This space is surmounted by a distributor 9 fixed to the sidewall 10 of the column. On this distributor rests another distillation section 11, also with structured packing.

Figure 2:
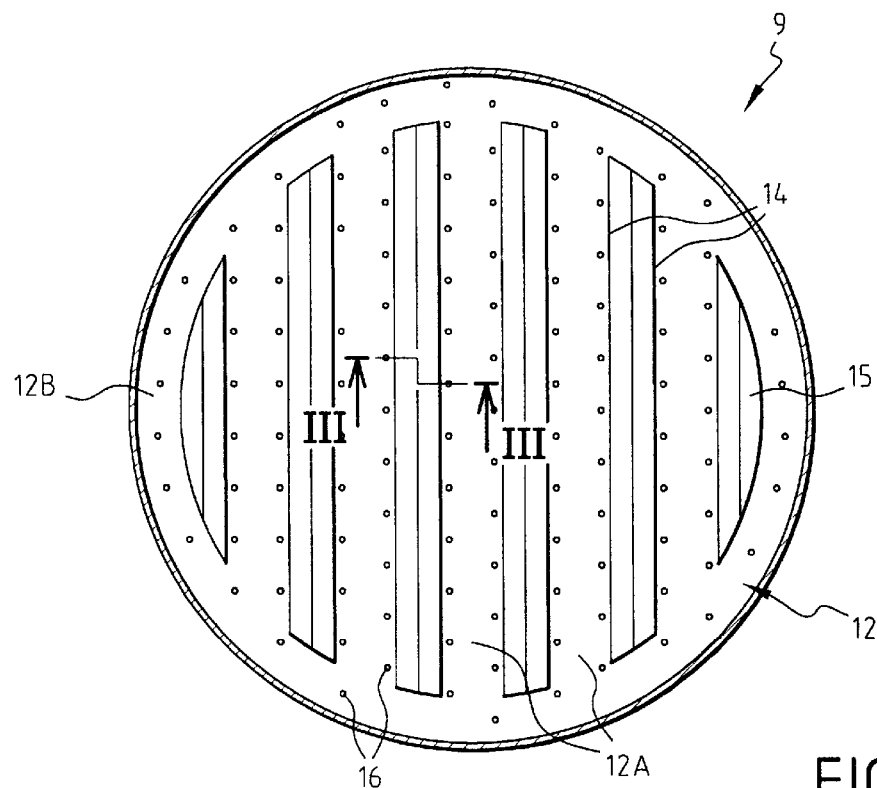
FIG. 2 is a cross-sectional view on the line II—II of FIG. 1, on a larger scale.
Figure 3:
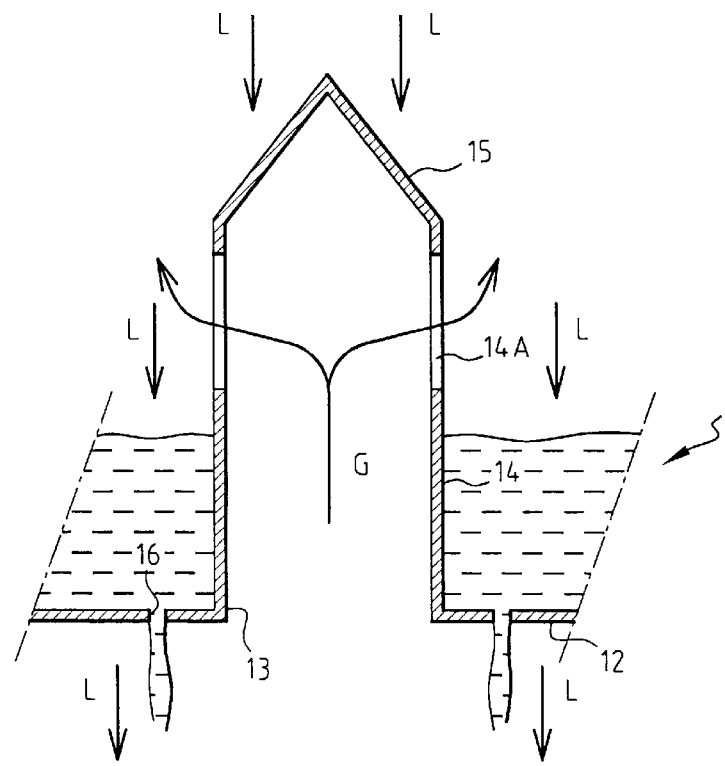
FIG. 3 is a fragmentary view in cross-section on the line III—III of FIG. 2, on a still larger scale.

As is well known in the art, the distributor 9 (FIGS. 1 to 3), comprises a flat perforated bottom 12 provided with a series of elongated openings 13 parallel to each other, of which each extends over most of a chord of the bottom 12. The perforated region of the bottom 12 is thus constituted by a series of parallel strips 12A and a peripheral ring 12B. A vertical wall 14, provided in its upper portion with a row of windows 14A (FIG. 3) for the passage of gas, rises along each edge of each opening 13. The upper edges of the two walls 14 associated with each opening 13 are connected via a roof 15 of inverted V cross-section.

Seen in plan (FIG. 2), the perforations 16 of the bottom 12, which are circular and all of the same diameter, are substantially uniformly distributed, except possibly in the peripheral region. Their arrangement is such as to ensure optimum uniformity of the distribution of the liquid over all the upper surface 8 of the section 6.

Thus, in service, the liquid L which falls from the section 11 onto the distributor 9, forms a bath on the bottom 12, up to a level lower than that of the windows 14A, and the liquid from this bath is substantially uniformly distributed over the surface 8 of the section 6 through the perforations 16.

The rising gas passes between the pairs of walls 14 and rises to the section 11 through windows 14A.

A principal withdrawal conduit 17, provided with a valve 18, connects the space of the column 1 located just above the bottom 12, which is to say facing the bath of the distributor, to the head of the column 2. An auxiliary withdrawal conduit 19, provided with the valve 20, connects the same space to a pouring point 21 located in the space 7, in line with a predetermined localized region of the surface 8. In the illustrated example, it is a single region located substantially on the central axis X—X of the column 1.

The level of the withdrawal point 22 of the conduits 17 and 19 is, as is known, selected such that the liquid will be practically free from impurities heavier than oxygen.

In operation, the liquid which comes from the distributor 9 and which is not sent to the column 2 is totally poured over the surface 8. One fraction of this liquid is substantially uniformly distributed over this surface by the perforations 16, arranged for this purpose as indicated above, whilst another fraction, predetermined by the control offered by the valve 20, is poured at a single position 21 of the space 7 or, as a modification, at a small number of positions in this space.

There results a deliberate and predetermined non-uniformity of the distribution of the liquid over the upper surface of the section 6, and hence within the latter, and as a result a degradation of the operating conditions of this section. This permits enriching in oxygen the liquid sent to the column 2, without at the same time creating direct communication between the region of the distributor 9, free from heavy impurities, and the bottom of the column 1, polluted by these impurities. Moreover, it is easy to calculate the height of the section 6 such that this result will be obtained without the content in impurities of the liquid sent to the column 2 being increased.

Figure 4:
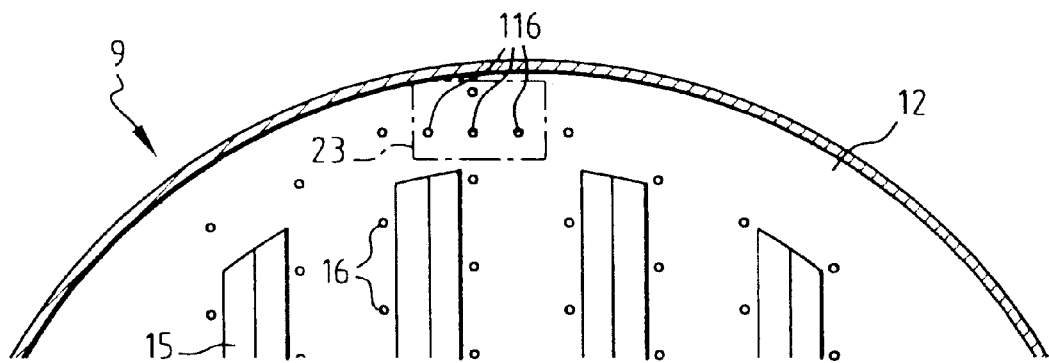
FIG. 4 is a fragmentary view similar to FIG. 2, on an enlarged scale, showing another embodiment of the practice of the invention.

In the modification of FIG. 4, the conduit 19 is omitted. The bottom 12 comprises, in line with at least one localized region 23 of the surface 8 located in this example adjacent the periphery of the distributor, a certain number of supplemental circular perforations 116 of the same diameter as the perforations 16.

As a result, in operation, the region 23 of the surface 8 receives, per unit of surface, a flow rate of liquid substantially greater than that received by the rest of the surface 8. The uniformity of distribution of the liquid in the packing 6 is hence degraded in a predetermined way as a result of the construction of the distributor itself, and this is accordingly also true of the effectiveness of the distillation in the section 6. Finally, as previously, the liquid sent to the column 2 is enriched in oxygen whilst remaining practically free from heavy impurities.

Figure 5:
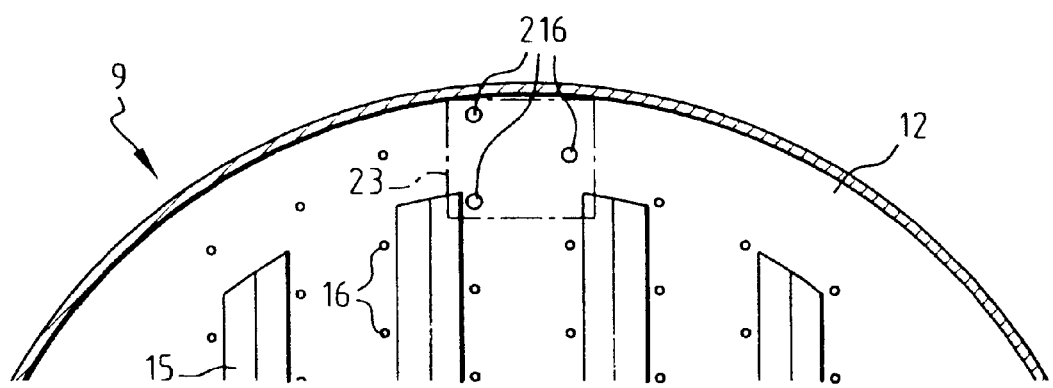
FIG. 5 is a view similar to FIG. 4 showing still another embodiment of the invention.

In the modification of FIG. 5, the same result is obtained, not by increasing the number of perforations in line with the region or regions 23, but by increasing there the cross-section for passage of the perforations 16. The enlarged perforations are designated 216.

In this modification, there can also be reduced the size of the perforations 216 instead of increasing them, which also leads to the desired predetermined non-uniformity of distribution.

Of course, the solutions of FIGS. 1, 4 and 5 can be combined with each other.

The invention is applicable also to the extraction of a flow of a mixture constituted essentially of argon and oxygen, several plates above the supply of an impure argon production column (or "argon mixture column"), and to the introduction of this flow, substantially free from heavy impurities, into an ultra-pure oxygen production column such as the column 2.

What is claimed is:

1. A process for the production of ultra-pure oxygen comprising the steps of:

introducing a mixture containing oxygen into a distillation column and producing a bottom product rich in oxygen;

withdrawing an intermediate flow, substantially free from impurities heavier than oxygen, at a level of the column located above the point of introduction of said mixture, the point of withdrawal being separated from the point of introduction by a distillation section;

sending the flow withdrawn to an oxygen purification column which produces at its bottom ultra-pure oxygen; and distributing a reflux liquid over said section by means of a distributor comprising perforations for the passage of liquid and openings for the passage of gas, wherein there is a predetermined non-uniformity of the distribution of the reflux liquid over the upper surface of said section in at least one localized region of the surface.

2. The process according to claim 1, wherein the predetermined non-uniformity is effected by withdrawing from the distillation column a control fraction of the liquid which supplies the distributor and by locally re-injecting this fraction into the same column below the distributor and over the upper surface of said section, such that the location or locations of said upper surface which receive this fraction, receive a flow rate of liquid substantially greater than that received by the other locations on said surface.

3. The process according to claim 1, wherein the predetermined non-uniformity is effected by creating a non-uniformity of the perforations for passage of liquid from the distributor in line with said region, relative to an arrangement of the perforations leading to a distribution of the liquid of optimum uniformity over said upper surface.

4. The process according to claim 1, wherein said localized region is adjacent the central axis of the column.

5. The process according to claim 1, wherein said localized region is adjacent the periphery of the distributor.

6. The process according to claim 1, wherein there is poured over said upper surface all the liquid which supplies the distributor and which is not sent to the purification column.

7. The process according to claim 1, wherein the mixture containing oxygen comprises air.

8. The process according to claim 1, wherein the distillation section comprises packing.

9. An instillation for the production of ultra-pure oxygen comprising:

a distillation column provided with a point of introduction of a mixture containing oxygen and a point of withdrawal of an intermediate flow substantially free from impurities heavier than oxygen, the point of withdrawal being located above the point for introduction of said mixture and being separated from the latter by a distillation section;

an oxygen purification column which produces at its bottom ultra-pure oxygen;

a conduit which connects said point of withdrawal to the head of the oxygen purification column; and means for distributing reflux liquid over the upper surface of said section, the means comprising a distributor which comprises perforations for the passage of liquid and openings for the passage of gas, wherein the distribution means are adapted to produce a predetermined non-uniformity of the distribution of the reflux liquid over the upper surface of said section in at least one localized region of the surface.

10. The installation according to claim 9, wherein the distribution means comprise a conduit for withdrawal from the distillation column of a controlled fraction of the liquid which supplies the distributor, and for re-injection in the distillation column of the fraction below the distributor and over the upper surface of said section, such that the location or locations of said upper surface which receive the fraction receive a substantially greater flow rate of liquid than that received by the other positions on said surface.

11. The installation according to claim 9, wherein the distributor comprises a perforated bottom whose perforations have a predetermined non-uniformity relative to the arrangement of perforations which would give a distribution of the liquid of optimum uniformity over said upper surface.

12. The installation according to claim 11, wherein, in line with said region, the distributor comprises perforations for the passage of supplemental liquid relative to an arrangement of perforations leading to a distribution of the liquid of optimum uniformity over said upper surface.

13. The installation according to claim 11, wherein, in line with said region, the distributor comprises perforations for the passage of liquid of increased or reduced dimensions, relative to an arrangement of the same perforations leading to a distribution of the liquid of optimum uniformity over said upper surface.

14. The installation according to claim 9, wherein said localized region is adjacent the central axis of the column.

15. The installation according to claim 9, wherein said localized region is adjacent the periphery of the distributor.

16. The installation according to claim 9, wherein the distillation section comprises packing.

* * * * *